United States Patent
Basra et al.

(10) Patent No.: US 7,023,650 B2
(45) Date of Patent: Apr. 4, 2006

(54) OPTICAL SENSOR TO RECORDING HEAD ALIGNMENT

(75) Inventors: Vijay K. Basra, Reading, MA (US);
Leo Guglielmo, Ormond Beach, FL (US); George Bellesis, Jefferson, MA (US)

(73) Assignee: Quantum Corporation, San Jose, CA (US)

( * ) Notice: Subject to any disclaimer, the term of this patent is extended or adjusted under 35 U.S.C. 154(b) by 787 days.

(21) Appl. No.: 10/037,083

(22) Filed: Nov. 7, 2001

(65) Prior Publication Data

US 2003/0086199 A1 May 8, 2003

(51) Int. Cl.
*G11B 5/584* (2006.01)

(52) U.S. Cl. .................................. 360/77.12; 360/122

(58) Field of Classification Search ............ None
See application file for complete search history.

(56) References Cited

U.S. PATENT DOCUMENTS

| | | | |
|---|---|---|---|
| 2,923,781 A | 2/1960 | Gordon et al. | |
| 3,404,392 A | 10/1968 | Sordello | |
| 3,426,337 A | 2/1969 | Black et al. | |
| 3,637,991 A | 1/1972 | Yanagawa | |
| 3,662,120 A | 5/1972 | Hess | |
| 3,768,752 A | 10/1973 | Bettini et al. | |
| 3,790,755 A | 2/1974 | Silverman | |
| 3,838,291 A | 9/1974 | Marion et al. | |
| 3,914,793 A | 10/1974 | Burnham | |
| 3,916,039 A | 10/1975 | Akashi et al. | |
| 3,980,480 A | 9/1976 | Laridon et al. | |
| 4,008,085 A | 2/1977 | Lemahieu et al. | |
| 4,123,788 A | 10/1978 | Kruger | |
| 4,176,381 A | 11/1979 | de Niet et al. | |
| 4,275,425 A | 6/1981 | Watanabe et al. | |
| 4,313,143 A | 1/1982 | Zarr | |
| 4,315,283 A | 2/1982 | Kinjo et al. | |
| 4,340,305 A | 7/1982 | Smith et al. | |
| 4,371,904 A | 2/1983 | Brooke | |
| 4,380,032 A | 4/1983 | Pfost | |
| 4,424,111 A | 1/1984 | Zielke et al. | |
| 4,558,383 A | 12/1985 | Johnson | |
| 4,570,191 A | 2/1986 | Di Stefano et al. | |
| 4,578,311 A | 3/1986 | Ishikuro et al. | |
| 4,626,469 A | 12/1986 | Yamaguchi et al. | |
| 4,633,451 A | 12/1986 | Ahn et al. | |
| 4,679,104 A | 7/1987 | Dahlerud | |
| 4,737,877 A | 4/1988 | Krongelb et al. | |

(Continued)

FOREIGN PATENT DOCUMENTS

CH 586 944 4/1977

(Continued)

Primary Examiner—K. Wong
(74) Attorney, Agent, or Firm—Morrison & Foerster LLP

(57) ABSTRACT

A technique of positioning a recording head relative to an optical servo system in a magnetic recording tape system read/write assembly is described. The technique includes positioning an optical sensor of the optical servo system at a first position relative to a selected one of recording channels on the recording head and positioning the optical sensor at a second position relative to the selected recording channel using an alignment target on the recording head.

A recording head in a read/write assembly of a magnetic recording tape system is also described. The recording head includes recording channels fabricated on a wafer and an alignment target affixed to the wafer between a first read-write element of a recording channel and a second read-write element of the recording channel, the alignment target fabricated to produce an optical reflectance signal.

13 Claims, 6 Drawing Sheets

U.S. PATENT DOCUMENTS

| | | |
|---|---|---|
| 4,746,542 A | 5/1988 | Chino et al. |
| 4,750,067 A | 6/1988 | Gerfast |
| 4,802,030 A | 1/1989 | Henry et al. |
| 4,816,939 A | 3/1989 | Ford et al. |
| 4,816,941 A | 3/1989 | Edel et al. |
| 4,843,494 A | 6/1989 | Cronin et al. |
| 4,848,698 A | 7/1989 | Newell et al. |
| 4,868,046 A | 9/1989 | Moriizumi et al. |
| 4,876,886 A | 10/1989 | Bible et al. |
| 4,884,260 A | 11/1989 | Bouldin et al. |
| 4,935,835 A | 6/1990 | Godwin et al. |
| 4,937,810 A | 6/1990 | Drexler et al. |
| 4,958,245 A | 9/1990 | Roth et al. |
| 4,961,123 A | 10/1990 | Williams et al. |
| 4,969,058 A | 11/1990 | Williams et al. |
| 4,983,496 A | 1/1991 | Newell et al. |
| 5,008,765 A | 4/1991 | Youngquist |
| 5,016,240 A | 5/1991 | Strandjord et al. |
| 5,038,030 A | 8/1991 | Hayashi et al. |
| 5,050,017 A | 9/1991 | Carr et al. |
| 5,065,387 A | 11/1991 | Roth et al. |
| 5,067,039 A | 11/1991 | Godwin et al. |
| 5,105,322 A | 4/1992 | Steltzer |
| 5,120,927 A | 6/1992 | Williams et al. |
| 5,121,371 A | 6/1992 | Farnsworth et al. |
| 5,163,032 A | 11/1992 | Van Nieuwland et al. |
| 5,196,297 A | 3/1993 | Dombrowski et al. |
| 5,196,969 A | 3/1993 | Iwamatsu et al. |
| 5,210,672 A | 5/1993 | Ivers et al. |
| 5,229,620 A | 7/1993 | Pahr |
| 5,262,908 A | 11/1993 | Iwamatsu et al. |
| 5,279,775 A | 1/1994 | Thomas et al. |
| 5,280,402 A | 1/1994 | Anderson et al. |
| 5,283,773 A | 2/1994 | Thomas et al. |
| 5,311,378 A | 5/1994 | Williams et al. |
| 5,319,507 A | 6/1994 | Umebayashi et al. |
| 5,322,987 A | 6/1994 | Thomas et al. |
| 5,333,091 A | 7/1994 | Iggulden et al. |
| 5,349,484 A | 9/1994 | Koehler |
| 5,363,255 A | 11/1994 | Ivers et al. |
| 5,369,631 A | 11/1994 | Hwang |
| 5,371,636 A | 12/1994 | Nayak et al. |
| 5,379,283 A | 1/1995 | Miyajima |
| 5,379,710 A | 1/1995 | Parnigoni |
| 5,414,578 A | 5/1995 | Lian et al. |
| 5,414,585 A | 5/1995 | Saliba |
| 5,432,652 A | 7/1995 | Comeaux et al. |
| 5,448,430 A | 9/1995 | Bailey et al. |
| 5,450,257 A | 9/1995 | Tran et al. |
| 5,452,152 A | 9/1995 | Rudi |
| 5,457,586 A | 10/1995 | Solhjell |
| 5,462,823 A | 10/1995 | Evans et al. |
| 5,510,140 A | 4/1996 | Kurose et al. |
| 5,515,212 A | 5/1996 | Chiao et al. |
| 5,518,804 A | 5/1996 | Mizuno et al. |
| 5,523,904 A | 6/1996 | Saliba |
| 5,530,608 A * | 6/1996 | Aboaf et al. ............... 360/316 |
| 5,532,042 A | 7/1996 | Kawarai et al. |
| 5,535,069 A | 7/1996 | Chiao et al. |
| 5,563,868 A | 10/1996 | Farnsworth et al. |
| 5,566,033 A | 10/1996 | Frame et al. |
| 5,589,247 A | 12/1996 | Wallack et al. |
| 5,615,205 A | 3/1997 | Belser |
| 5,661,616 A | 8/1997 | Tran et al. |
| 5,661,823 A | 8/1997 | Yamauchi et al. |
| 5,674,583 A | 10/1997 | Nakayama et al. |
| 5,675,448 A | 10/1997 | Molstad et al. |
| 5,677,806 A | 10/1997 | Eckberg et al. |
| 5,680,278 A | 10/1997 | Sawtelle, Jr. |
| 5,689,384 A | 11/1997 | Albrecht et al. |
| 5,705,268 A | 1/1998 | Ishikawa et al. |
| 5,708,633 A * | 1/1998 | Hollen et al. ............. 369/44.11 |
| 5,718,036 A * | 2/1998 | Oji et al. .................. 29/603.12 |
| 5,718,964 A | 2/1998 | Naoe et al. |
| 5,726,834 A | 3/1998 | Eckberg et al. |
| 5,774,313 A | 6/1998 | Tanaka et al. |
| 5,855,589 A | 1/1999 | McEwen et al. |
| 5,858,589 A | 1/1999 | Govaert et al. |
| 5,872,675 A | 2/1999 | Solhjell |
| 5,877,910 A | 3/1999 | Williams et al. |
| 5,993,948 A | 11/1999 | Yamazaki et al. |
| 6,033,752 A | 3/2000 | Suzuki et al. |
| 6,063,489 A | 5/2000 | Kobayashi et al. |
| 6,075,678 A | 6/2000 | Saliba |
| 6,084,740 A | 7/2000 | Leonhardt et al. |
| 6,103,365 A | 8/2000 | Ishii et al. |
| 6,108,159 A | 8/2000 | Nute et al. |
| 6,236,529 B1 | 5/2001 | Leonhardt et al. |
| 6,246,535 B1 | 6/2001 | Saliba et al. |
| 6,319,595 B1 | 11/2001 | Katashima et al. |
| 6,531,436 B1 * | 3/2003 | Sahbari et al. ............. 510/176 |
| 6,646,830 B1 * | 11/2003 | Biskeborn et al. .......... 360/129 |
| 6,759,081 B1 * | 7/2004 | Huganen et al. ............. 427/58 |
| 6,778,358 B1 * | 8/2004 | Jiang et al. ................ 360/126 |
| 2001/0006437 A1 | 7/2001 | Leonhardt et al. |

FOREIGN PATENT DOCUMENTS

| | | |
|---|---|---|
| DE | 24 06 292 | 8/1975 |
| DE | 26 16 362 | 11/1977 |
| DE | 32 01 935 | 8/1983 |
| DE | 34 17 426 | 11/1985 |
| DE | 41 42 052 | 7/1992 |
| EP | 0 069 548 | 1/1983 |
| EP | 0 083 753 | 7/1983 |
| EP | 0 097 774 | 1/1984 |
| EP | 0 108 258 | 5/1984 |
| EP | 0 119 568 | 9/1984 |
| EP | 0 130 495 | 1/1985 |
| EP | 0 155 000 | 9/1985 |
| EP | 0 166 199 | 1/1986 |
| EP | 0 177 737 | 4/1986 |
| EP | 0 180 258 | 5/1986 |
| EP | 0 189 948 | 8/1986 |
| EP | 0 244 005 | 11/1987 |
| EP | 0 257 713 | 3/1988 |
| EP | 0 311 485 | 4/1989 |
| EP | 0 311 859 | 4/1989 |
| EP | 0 366 419 | 10/1989 |
| EP | 0 344 759 | 12/1989 |
| EP | 0 347 074 | 12/1989 |
| EP | 0 351 837 | 1/1990 |
| EP | 0 353 007 | 1/1990 |
| EP | 0 368 268 | 5/1990 |
| EP | 0 368 269 | 5/1990 |
| EP | 0 390 555 | 10/1990 |
| EP | 0 423 662 | 4/1991 |
| EP | 0 434 230 | 6/1991 |
| EP | 0 443 810 | 8/1991 |
| EP | 0 535 112 | 12/1991 |
| EP | 0 484 774 | 5/1992 |
| EP | 0 484 775 | 5/1992 |
| EP | 0 484 779 | 5/1992 |
| EP | 0 484 780 | 5/1992 |
| EP | 0 496 461 | 7/1992 |
| EP | 0 549 845 | 7/1993 |
| EP | 0 549 854 | 7/1993 |
| EP | 0 555 511 | 8/1993 |
| EP | 0 564 187 | 10/1993 |
| EP | 0 645 043 | 12/1993 |
| EP | 0 645 044 | 12/1993 |
| EP | 0 655 960 | 12/1993 |
| EP | 0 598 503 | 5/1994 |
| EP | 0 606 710 | 7/1994 |

| | | | | | | |
|---|---|---|---|---|---|---|
| EP | 0 684 597 | 11/1995 | | JP | 9-007131 | 1/1997 |
| EP | 0 854 471 | 7/1998 | | JP | 9-033773 | 2/1997 |
| EP | 1 026 665 | 8/2000 | | JP | 9-035246 | 2/1997 |
| EP | 1 026 666 | 8/2000 | | JP | 9-265626 | 10/1997 |
| EP | 1 026 667 | 8/2000 | | JP | 9-289885 | 11/1997 |
| EP | 1 117 092 | 7/2001 | | JP | 9-289973 | 11/1997 |
| FR | 2 315 142 | 1/1977 | | JP | 9-297914 | 11/1997 |
| GB | 2 008 290 | 5/1979 | | JP | 9-320197 | 12/1997 |
| GB | 1 595 136 | 8/1981 | | JP | 10-043924 | 2/1998 |
| GB | 2 121 227 | 12/1983 | | JP | 10-190867 | 7/1998 |
| GB | 2 335 785 | 9/1999 | | JP | 10-251432 | 9/1998 |
| JP | 55032273 A * | 3/1980 | | JP | 10-297181 | 11/1998 |
| JP | 56-111169 | 9/1981 | | JP | 11-066529 | 3/1999 |
| JP | 57-050346 | 3/1982 | | JP | 11-066745 | 3/1999 |
| JP | 57-120230 | 7/1982 | | JP | 11-096705 | 4/1999 |
| JP | 57-120255 | 7/1982 | | JP | 11-126328 | 5/1999 |
| JP | 61-142530 | 6/1986 | | JP | 4-305844 | 6/1999 |
| JP | 61-293372 | 12/1986 | | JP | 11-154312 | 6/1999 |
| JP | 62-192025 | 8/1987 | | JP | 11-161928 | 6/1999 |
| JP | 63-148416 | 6/1988 | | JP | 11-213383 | 8/1999 |
| JP | 63173210 A * | 7/1988 | | JP | 11-213384 | 8/1999 |
| JP | 63-251924 | 10/1988 | | JP | 11-242814 | 9/1999 |
| JP | 64-070916 | 3/1989 | | JP | 11-339254 | 12/1999 |
| JP | 2-169915 | 6/1990 | | JP | 11-353642 | 12/1999 |
| JP | 3-094881 | 4/1991 | | JP | 2001-048351 | 2/2001 |
| JP | 3-141087 | 6/1991 | | JP | 2001-067652 | 3/2001 |
| JP | 3-201215 | 9/1991 | | JP | 2001-076326 | 3/2001 |
| JP | 3-219432 | 9/1991 | | KR | 9406847 | 7/1994 |
| JP | 3-242816 | 10/1991 | | SU | 1137513 | 1/1985 |
| JP | 4-003832 | 1/1992 | | WO | WO 83/01858 | 5/1983 |
| JP | 4-038632 | 2/1992 | | WO | WO 85/02933 | 7/1985 |
| JP | 4-059399 | 2/1992 | | WO | WO 85/03376 | 8/1985 |
| JP | 4-252417 | 9/1992 | | WO | WO 88/02168 | 3/1988 |
| JP | 5-073883 | 3/1993 | | WO | WO 94/12975 | 6/1994 |
| JP | 6-020414 | 1/1994 | | WO | WO 99/21178 | 4/1999 |
| JP | 6-139549 | 5/1994 | | WO | WO 99/21179 | 4/1999 |
| JP | 6-243619 | 9/1994 | | WO | WO 99/27530 | 6/1999 |
| JP | 6-259736 | 9/1994 | | WO | WO 99/28909 | 6/1999 |
| JP | 7-029136 | 1/1995 | | WO | WO 00/49604 | 8/2000 |
| JP | 7-057412 | 3/1995 | | WO | WO 00/49605 | 8/2000 |
| JP | 7-065434 | 3/1995 | | WO | WO 00/49607 | 8/2000 |
| JP | 7-220255 | 8/1995 | | | | |
| JP | 7-082626 | 9/1995 | | * cited by examiner | | |
| JP | 8-174669 | 7/1996 | | | | |

OPTICAL SENSOR TO RECORDING HEAD ALIGNMENT

FIELD OF THE INVENTION

This invention relates to optical sensor to magnetic recording head alignment in a magnetic tape recording system.

BACKGROUND

To increase data storage and retrieval performance, many magnetic tape recording systems utilize multi-head, multi-channel fixed head structures with narrowed recording gaps and track widths so that many linear data tracks may be achieved on a tape medium of predetermined width. Tape substrates are also being made thinner with increased tape lengths in small diameter packages.

Head positioning optical servo systems are employed to position a recording head in a magnetic tape system over a selected track of data; these systems are generally referred to as laser-guided magnetic recording (LGMR) systems. Misalignment between the recording head and the data track may cause data errors during read back and data loss on adjacent tracks during writing.

To ensure a working recording head positioning optical servo system and magnetic tape cartridge interchange capability the optical servo system should be closely aligned with the magnetic recording head.

SUMMARY

In a general aspect, the invention features a method of positioning a recording head relative to an optical servo system in a magnetic recording tape system read/write assembly including positioning an optical sensor of the optical servo system at a first position relative to a selected one of a plurality of recording channels on the recording head and positioning the optical sensor at a second position relative to the selected recording channel using an alignment target on the recoding head.

In a preferred embodiment, positioning the optical sensor at the first position includes visually aligning under a microscope the optical sensor relative to the selected recording channel along an imaginary line with an optical sensor adjuster and temporary locking the optical servo system in place with the adjuster.

The alignment target includes etched parallel alignment grooves, the alignment grooves positioned parallel to a direction of magnetic tape travel. Each of the alignment grooves includes a profile to enhance optical signal reflectivity. The profile includes a groove depth, a sloped wall having a groove angle and a bottom shape. The groove depth is in the range of 200–300 nanometers. The groove angle is in the range of 50–60 degrees and the bottom shape is round.

Each of the alignment grooves is fabricated on a silicon wafer, an aluminum titanium carbide (AlTiC) wafer or a silicon/AlTiC wafer stack. The alignment grooves are fabricated using an image reversal resist process or a bi-layer resist process.

The alignment target is positioned between two elements of a selected recording channel pair.

Positioning the optical servo system at a second position includes directing a beam of light from the optical servo system towards the alignment grooves, moving the optical servo system perpendicularly to the alignment grooves until a minimum optical reflectance signal is detected by an optical sensor of the optical servo system and locking the optical servo system with the adjuster when a minimum optical reflectance signal is detected.

In another aspect, the invention features a recording head in a read/write assembly of a magnetic recording tape system including recording channels fabricated on a wafer and an alignment target affixed to the wafer between a first recording channel and a second element of the recording channel, the alignment target fabricated to produce an optical reflectance signal.

In a preferred embodiment, the alignment target is affixed to the wafer using an ultraviolet (UV) cured adhesive. The recording head and the alignment target are fabricated from the same material. The material is silicon, aluminum titanium carbide (AlTiC) or silicon-aluminum titanium carbide (AlTiC) stack.

The alignment target includes etched alignment grooves, each of the alignment grooves equally spaced apart from each other and arranged parallel to a direction of magnetic tape travel. The alignment grooves are fabricated using an image reversal resist process or using a bi-layer resist process.

Each of the alignment grooves has a profile to minimize optical signal reflectivity. The profile includes a groove depth, a sloped wall groove angle and a bottom shape. The groove depth is in the range of 200 to 300 nanometers. The sloped wall groove angle is in the range of 50 to sixty degrees. The bottom shape is round.

In another aspect, the invention features an alignment target for aligning a recording head relative to an optical servo system in a read/write assembly of a magnetic tape recording system including alignment grooves having dimensions to fit between two elements of the recoding channel pair residing on the recording head, the grooves oriented parallel to a direction of tape travel.

In a preferred embodiment, each of the alignment grooves is fabricated to a profile to minimize optical signal reflectance. The profile includes a groove depth, a sloped wall groove angle and a bottom shape. The groove depth is in the range of 200 to 300 nanometers. The sloped wall groove angle is in the range of 50 to sixty degrees. The bottom shape is round.

Embodiments of the invention may have one or more of the following advantages.

The alignment operation of the optical sensor of an optical servo system to the recording head can be achieved with high precision during engineering, manufacturing, and post shipment life since the alignment target is permanently fixed to the recording head.

The alignment target does not change over time and with varying thermal conditions since it is affixed to the recording head and thermally matched to the recording head.

The characteristics of the groove design of the alignment target have groove profile and surface reflectivity properties that eliminate unwanted secondary reflectance signals and provide a higher optical reflectance signal to optical sensor for position error reading and adjustment.

By optimizing the depth, the milled profile and the reflectivity ratio of the bottom portion of each alignment groove in the alignment target to the top surface around each alignment groove of the alignment target, high optical reflectance signals are obtained, thus providing precision feedback for alignment of the optical sensor of an optical servo system to a recording head.

While in service after manufacturing, a low power microscope may be used to recalibrate the alignment of the optic sensor to the recording head using the permanently positioned alignment target.

Alternative recording head designs may utilize the alignment target fabricated from a variety of materials such as silicon, aluminum titanium carbide (AlTiC) and a silicon/AlTiC stack.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
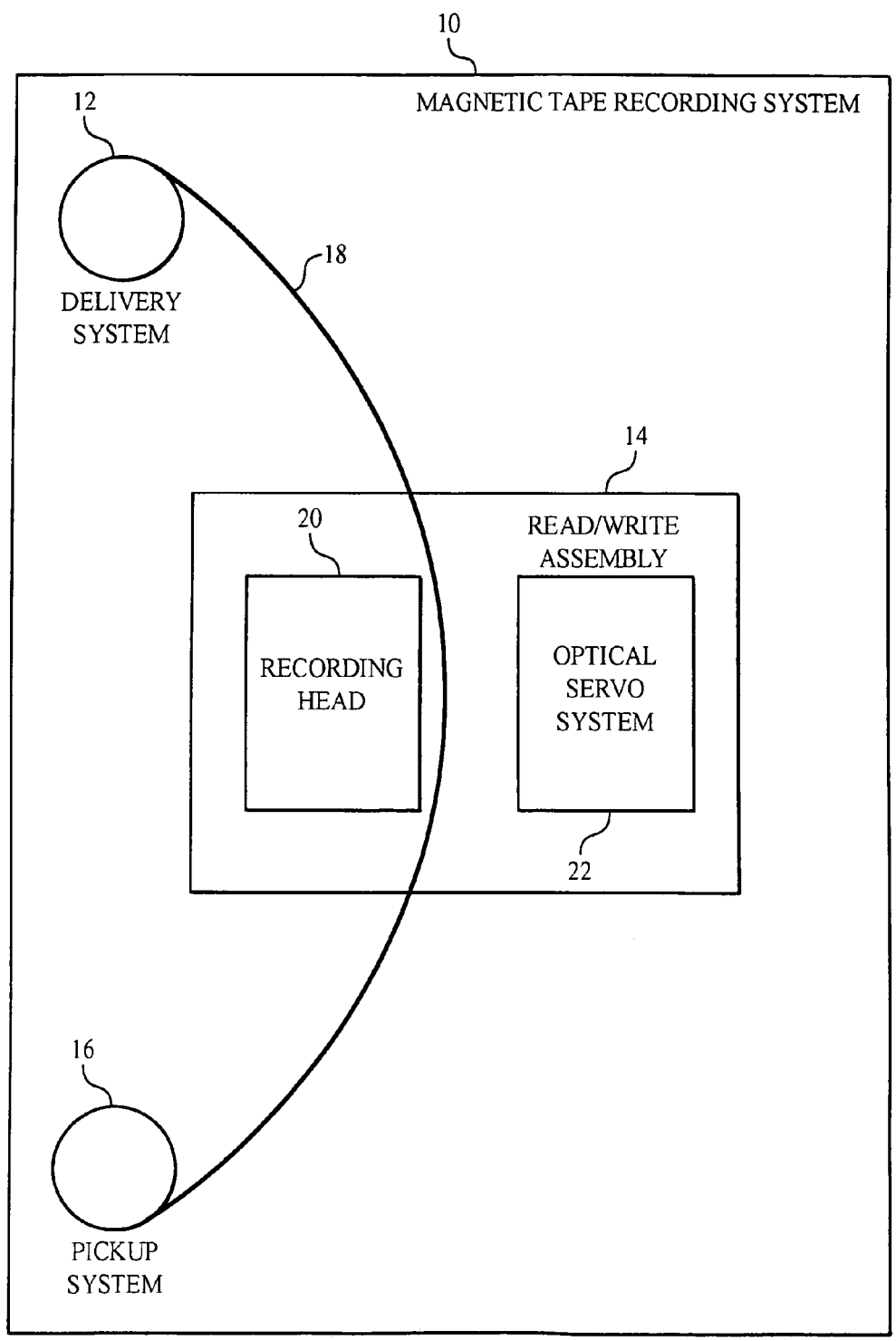
FIG. 1 is a block diagram of an exemplary magnetic tape recording system.

Referring to FIG. 1, an exemplary magnetic tape recording system 10 includes a delivery system 12, a read/write assembly 14 and a pickup system 16. The delivery system 12 houses a magnetic tape 18. The magnetic tape 18 travels past a recording head 20 and an optical servo system 22 contained in the read/write assembly 14 and is delivered to the pickup system 16. The recording head 20 reads and writes information, generally referred to as data, to a magnetic surface of the magnetic tape 18 as it travels from the delivery system 12 to the pickup system 16. As the magnetic tape 18 passes over the recording head 20 the magnetic tape 18 may become misaligned with respect to the intended track position due to, for example, lateral tape motion (LTM). Changes in lateral tape position are detected by the optical servo system 22 when optical servo tracks are located on a non-magnetic surface of the magnetic tape 18 and compensated for via a closed servo control loop.

Figure 2:
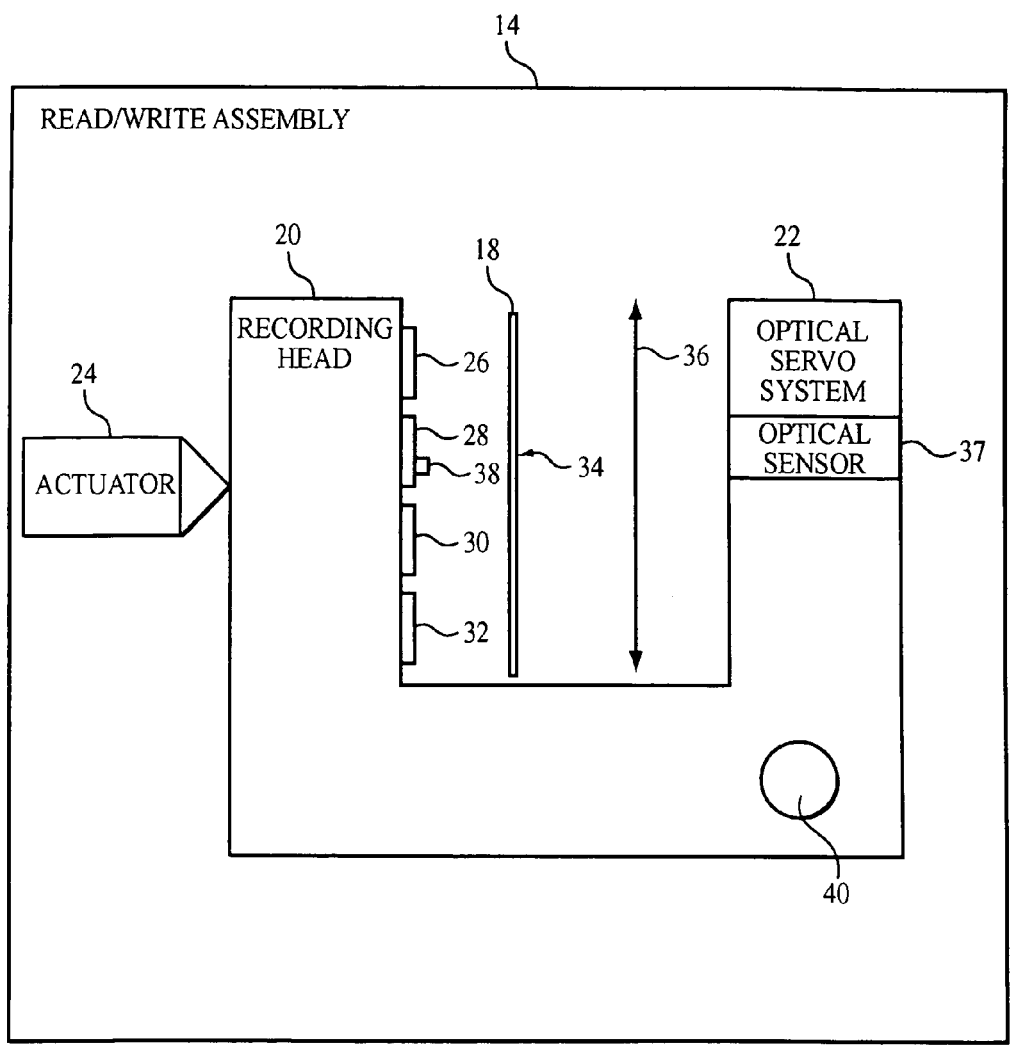
FIG. 2 is a block diagram of a cross section of the read/write assembly of FIG. 1.

Referring to FIG. 2, the read/write assembly 14 includes the recording head 20 and the optical servo system 22. An actuator 24 is shown connected to the read/write assembly 14. In operation, the recording head 20 and the optical servo system 22 are fixed in position relative to each and thus move in unison when the read/write assembly 14 is moved. The magnetic tape 18 moves across the recording head 20 and a set of four data tracks (not shown) are recorded to or read from the magnetic tape 18. In this example, the recording head 20 includes a series of recording channels 26, 28, 30 and 32 residing on the recording head 20. Each recording channel includes bumps having a writer and a reader that writes and reads data to and from the magnetic tape 18 respectively. In operation, the optical servo system 22 utilizes a servo track (not shown) on a non-magnetic surface 34 of the magnetic tape 18 to detect lateral tape motion (LTM) of the magnetic tape 18 along an axis 36. Compensation of LTM is done by positioning of the read/write assembly 14 relative the tape 18 via movement of the actuator 24.

More specifically, the optical servo system 22 directs a beam of light upon a particular one of the optical servo tracks located on the non-magnetic surface 34 of the magnetic tape 18. Reflections of the beam of light from the optical servo track result in electronically discernible LTM position error signals. The position error signals are sent to an optical feedback control loop that generates a bi-directional head position correction sending current to a coil motor that results in a servo bias torque. The bias torque is applied to the actuator 24 to move the read/write assembly 14 along the axis 36 relative to the magnetic tape 18 and thereby follow the magnetic tape 18 despite the presence of LTM.

During manufacture of the read/write assembly 14, an optical sensor 37 of the optical servo system 22 is located at a first position relative to one of the recording channels on the recording head 20. The optical sensor 37 of the optical servo system 22 is closely aligned at a second position relative to the recording channel on the recording head 20 using an alignment target 38. The alignment target 38 is used to manually position via an adjuster 40 the optical sensor 37 of the optical servo system 22 and the selected recording channel. This alignment process using the alignment target 38 may be used during the manufacturing of the read/write assembly 14. The alignment target 38 may also be used to closely align the optical sensor 37 and the selected recording channel in the field at a customer's site. Using the alignment target 38, the adjuster 40 is used to move and lock into position the optical servo system 22 relative to the recording head 20. The adjuster 40 moves the optical servo system 22 in a direction parallel to the axis 36. The adjuster 40 is also capable of rotating the optical servo system 22 relative to the recording head 20 and thus adjust an azimuth of the optical servo system 22 relative to the recording head 20. Without this alignment during system 14 production, misalignment of the optical servo system 22 and the recording head 20 may yield a large lateral offset between the two. This could lead to the inability of a recording head in a second, different, magnetic tape recording system from reading data on a tape that has been written on the tape by a recording head in a first magnetic tape recording system due to the large lateral offset between optical servo systems and recording heads in the respective magnetic tape recording systems.

More specifically, if data is written to a magnetic tape by a first recording head having a large lateral offset from its optical servo system, a second recording head having a large but opposite lateral offset from its optical servo system will be unable to compensate for the difference between the first and second offsets because of an inherent limited range of lateral motion in each recording head. The second recording head will be unable to read the data from the magnetic tape. Thus, it is important to minimize the offset of optional servo systems to recording heads in all magnetic tape recording systems.

Figure 3:
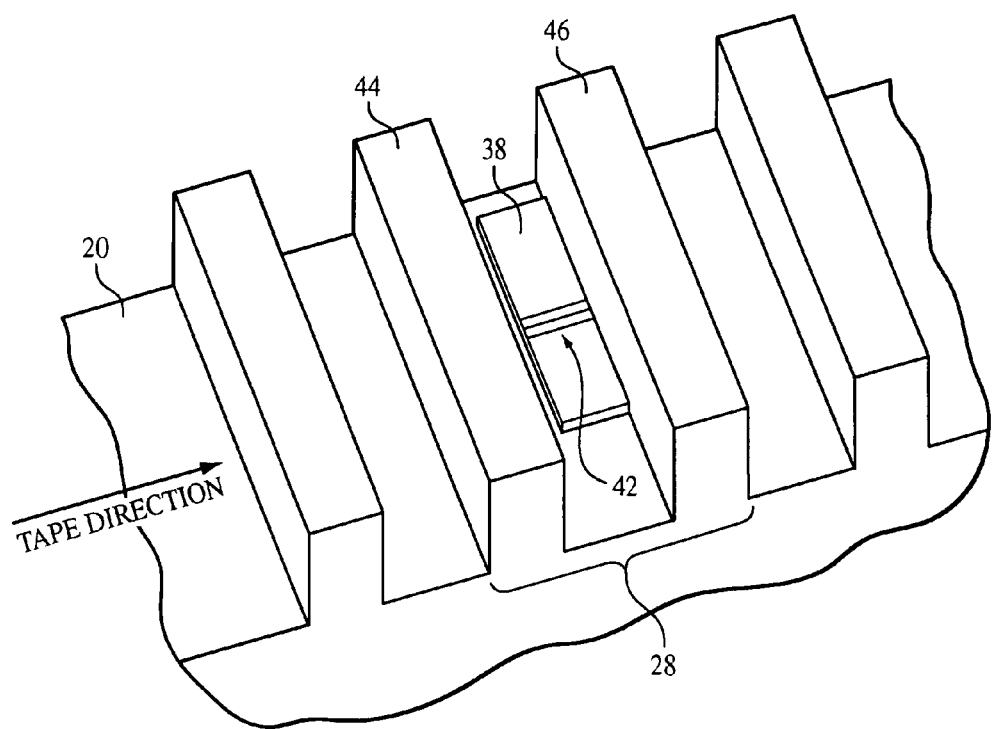
FIG. 3 is a prospective view of the recording head of FIG. 1.

Referring to FIG. 3, a front prospective of a portion of the recording head 20 includes the alignment target 38 positioned, for example, between bump 44 and bump 46 of recording channel 28. Thus, the alignment target 38 with grooves 42 resides between bumps 44 and 46. Read and write elements are located on bumps 44 and 46, i.e., a channel pair is divided. One element of a pair resides on one bump and the other element of a pair resides on the other bump. By element we mean a merged read-write thin-film transducer. For a recording head with more than one channel, other pairs would also reside on bumps 44 and 46. Each channel pair is arranged so that the tape 18 passes one element of a pair on one bump to the other element of the pair on the other bump. In this manner, data that is written by each channel on one bump is immediately read and verified by the matching channel element on the other bump. In general, a bump is a surface shaped so that aerodynamic forces hold the tape to the bump as the tape travels over the read-write head.

The alignment target 38 is fabricated and permanently affixed to the recording head 20 so it will not interfere or make physical contact with the magnetic tape 18 as the magnetic tape 18 travels across the bumps of the recording channels 26, 28, 30 and 32 during the operation of magnetic tape recording system 10.

In another example, the alignment target 38 is made on a flat head recording head (not shown) that has no bumps present. A flat head recording head includes a signal exchange surface that is substantially flat along the entire length over which it contacts the tape. Alignment grooves are cut on the recording head itself between read write elements.

As mentioned above, the alignment target 38 is used to closely align the selected recording channel relative to the optical sensor 37 of the optical servo system 22 during manufacture of the read/write assembly 14 and thus minimize an offset between the recording head 20 and the optical servo system 22. In addition, since the alignment target 38 is permanently affixed to the recording head 20 between bumps, the alignment target 38 may be used in the field after manufacturing to align the optical sensor 37 relative to the selected recording channel to keep any increment in lateral offset that develops over time while in service minimized.

The alignment target 38 includes one or more alignment grooves 42. The alignment grooves 42 are etched into the alignment target 38 and oriented to provide an optical reflectance signal in conjunction with the optical servo system 22. This optical reflectance signal is detected by the optical sensor 37 and used to closely align the optical servo system 22 to the selected recording channel via the adjuster 40.

Figure 4:
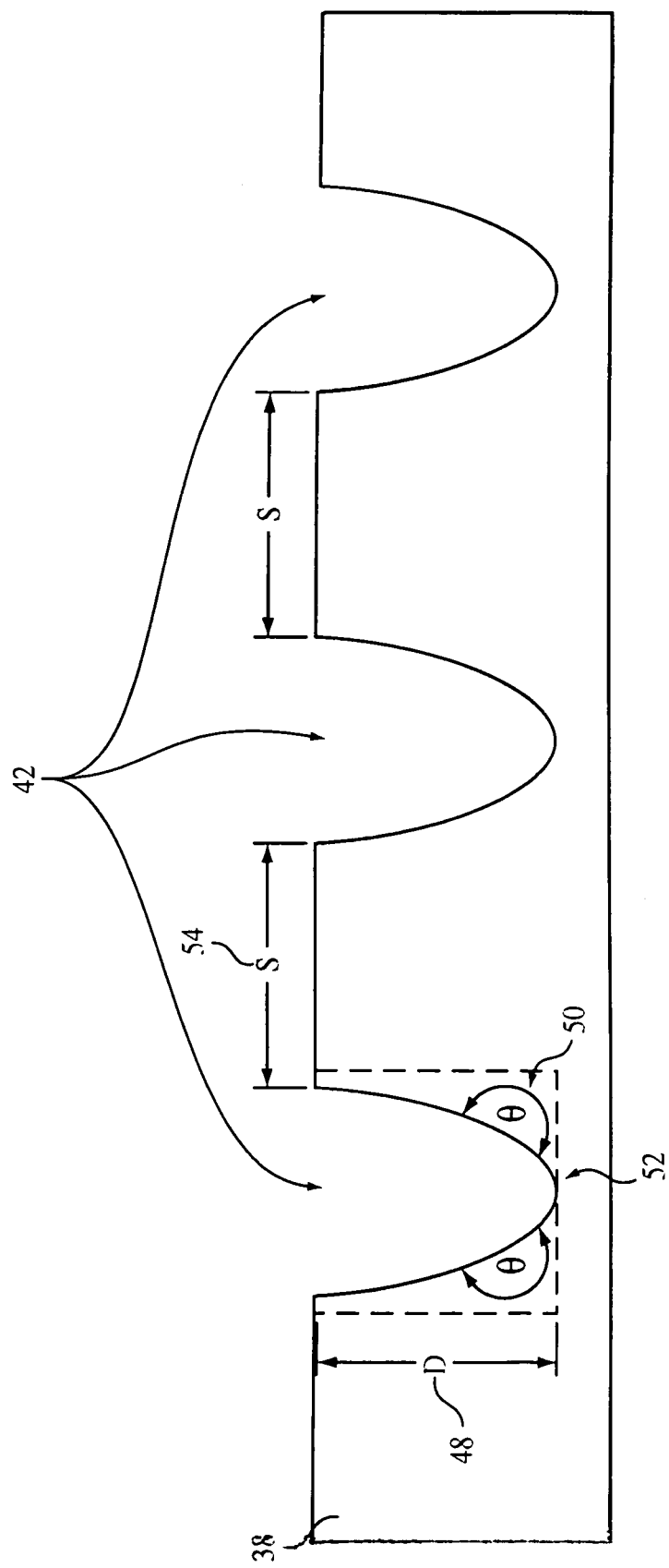
FIG. 4 is a cross sectional view of the alignment target of FIG. 2.

Referring to FIG. 4, a cross-section of the alignment target 38 illustrates the three etched alignment grooves 42. Although a single alignment groove may be utilized, using three alignment grooves 42 provides for an azimuth adjustment, described below. Each of the alignment grooves 42 is fabricated to a profile to provide a high contrast optical reflectance signal when the optical servo system 22 directs a beam of light towards the alignment target 38. To achieve a high contrast optical reflectance signal, it is preferred that each of the alignment grooves 42 has a depth (D) 48 of three hundred to four hundred nanometers. It is also preferred that each of the alignment grooves 42 be shaped with a fifty to sixty degree wall angle ($\theta$) 50 and a rounded bottom 52. It is more preferred that the wall angle ($\theta$) 50 be fifty-four degrees. This combination of depth 48, angle 50 and rounded bottom 52 orientation provides a generally low optical reflectance signal.

Each of the alignment grooves 42 is spaced apart to adapt to an alignment process, described below, using one or more spots of light directed by the optical servo system 22 towards the alignment grooves 42. A groove-to-groove spacing (S) 54 of approximately twenty-four micrometers (24 µm) is preferred, although other groove-to-groove spacing can be utilized.

Each of the alignment grooves 42 is formed in silicone using wet chemical etching, dry chemical etching or ion milling. Angled ion milling provides a suitable alignment groove profile that produces a low optical reflectance signal. Wet chemical etching of silicon using crystal orientation dependent etching methods also provides a consistent alignment groove profile.

Aluminum titanium carbide (AlTiC) patterning is performed using an image reversal resist process. Alternatively, AlTiC patterning is performed using a bi-layer resist process. Each of the alignment grooves 42 in the AlTiC wafer is ion milled at a high angle to produce a sloped wall in the groove. The angle $\theta$ 50 of this wall is such that the optical sensor 37 of the optical servo system 22 does not receive any reflection of light from the wall of an alignment groove. If AlTiC patterning is performed using an image reversal resist process, a dielectric such as aluminum oxide ($Al_2O_3$) can be deposited into the alignment grooves 42 and using the lift-off properties of image reversal the excess alumina can be removed from outside the alignment grooves 42.

Alternatively, a lower optical reflectance signal can be achieved from the alignment target 38 by using a single layer antireflection (AR) coating deposited in the alignment grooves 42 using image reversal photolithographic techniques. The high contrast achievable on AlTiC with the use of a metallic reflective coating, such as Chromium, is also possible.

The ability to have the alignment target 38 made of AlTiC means there is no thermal expansion differences between the recording head 20 and the alignment target 38 since the recording head 20 is typically fabricated from a AlTiC wafer. It is preferred that the alignment target 38 be fabricated from the same material used to fabricate the recording head.

As mentioned above, the alignment target 38 is cut to fit between a recording channel pair. The alignment target 38 is meant to be a permanent feature of the recording head 20. The alignment target 38 is thinned so as not to protrude past the recording channel bumps and interfere with the magnetic tape 12 as it travels across the recording channels.

Figure 5:
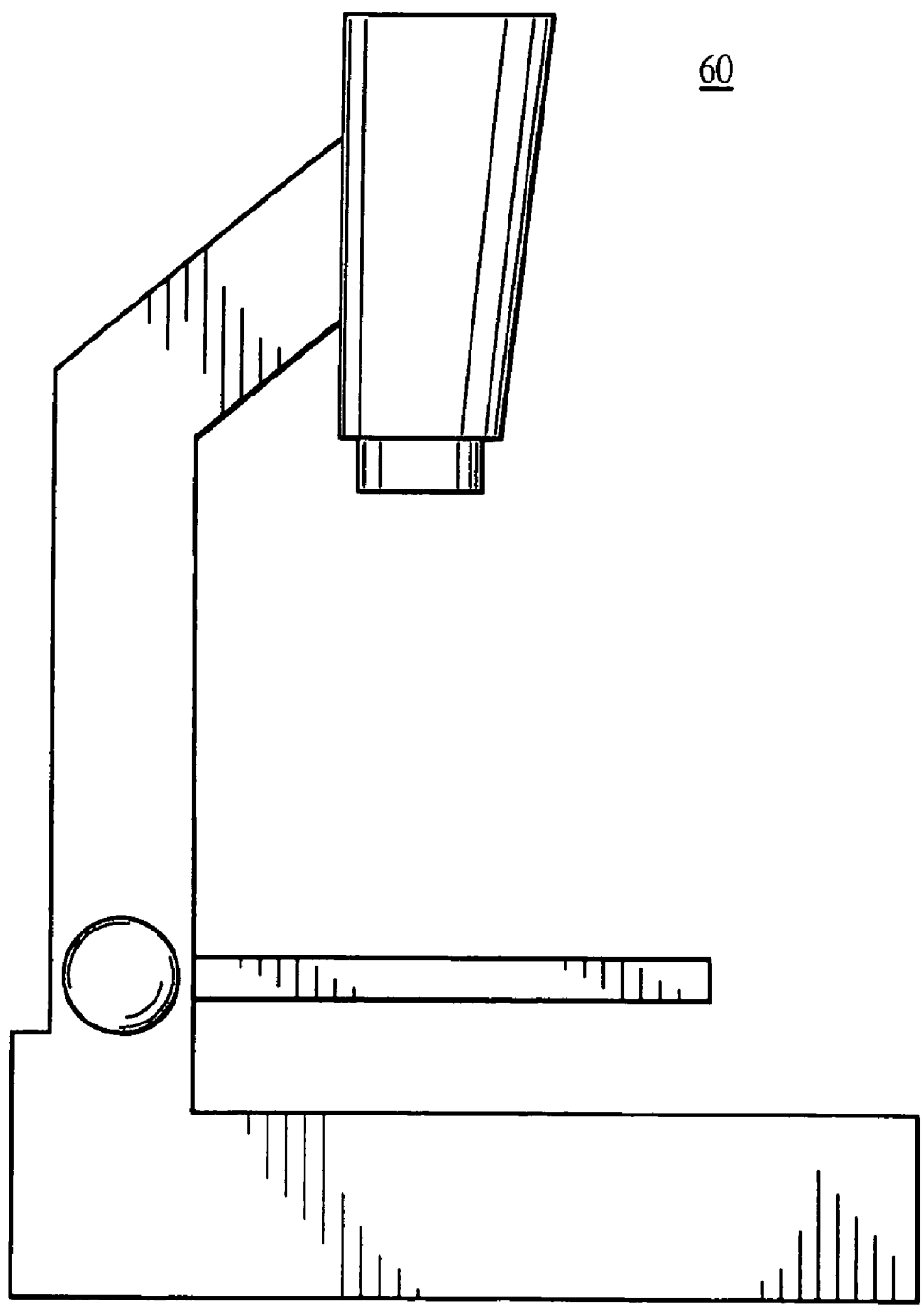
FIG. 5 is a block diagram of an exemplary microscope.
Figure 6:
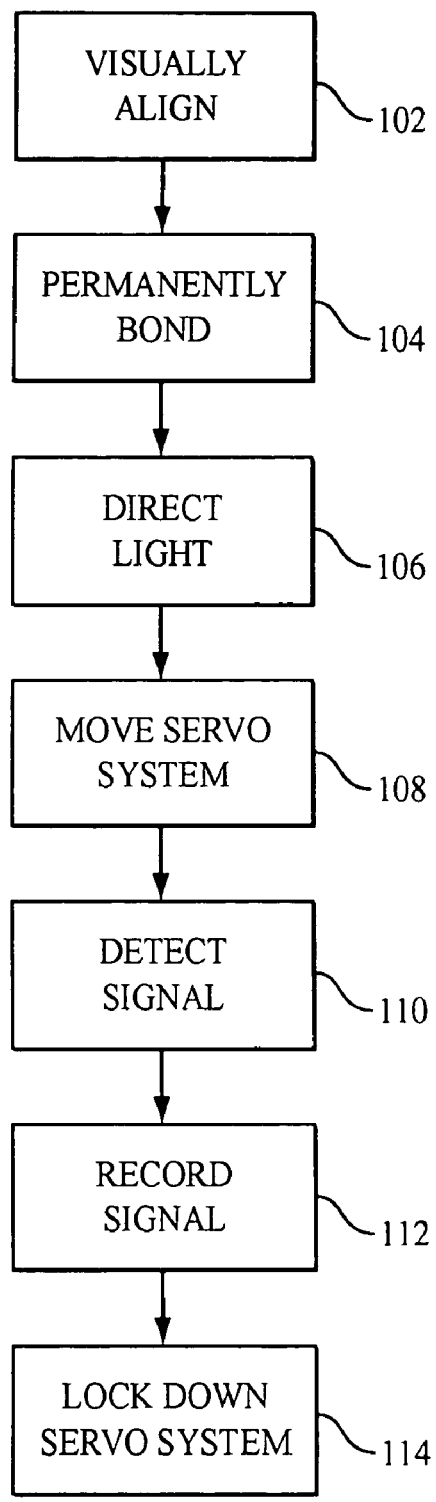
FIG. 6 is a flow diagram of an alignment process.

After the alignment target 38 is fabricated it is manually placed between a recording channel pair. Referring to FIG. 6, an alignment process 100 includes visually aligning (102) one or more of the alignment grooves 42 of the alignment target 38 under a microscope, such as microscope 60 in FIG. 5, to an imaginary line connected to a selected recording channel. Once visually lined up along the imaginary line, the alignment target 38 is permanently bonded (104), preferably with an ultraviolet (UV) cured adhesive, to the recording head 20, between the recording pair.

After the alignment target 38 is permanently bonded to the recording head 20, one or more spots of light are directed (106) towards the alignment target 38 by the optical servo system 22. Using the adjuster 40, the spots of light produced by the optical servo system 22 are moved (108) across the alignment groove(s) 42 in a direction perpendicular to the direction of tape motion, i.e., across the alignment grooves 42 etched in the alignment target 38. As a spot of light hits the alignment target 38 it is reflected back, producing an optical reflectance signal. The optical sensor 37 of the optical servo system 22 detects (110) the optical reflectance signal. During the perpendicular motion, reflectance of the spot(s) is received by the optical servo system 22 and recorded (112). When the spot of light is centered over one of the alignment grooves 42 the optical reflectance signal is at a minimum and the corresponding voltage is at a maximum. By moving the optical servo system 22 laterally across the alignment grooves 42 using the adjuster 40, the optical servo system 22 can be closely aligned to any one of the alignment grooves 42 on the alignment target 38. Once the optical servo system 22 is closely aligned to a selected one of the grooves 42, i.e., a minimum reflectance/maximum voltage is detected, the optical servo system 22 is manually locked down (114) with the adjuster 40. The alignment process 100 minimizes the lateral offset between the selected recording channel and the optical servo system 22. The recording head 20 is ready for the subsequent steps in the manufacturing process.

The alignment process 100 described above may also be used to adjust an optical azimuth between the recording head 20 and the optical servo system 22. In operation, three equally spaced spots of light are directed by the optical servo system 22 towards the three equally spaced apart alignment grooves 42 on the alignment target 38. The optical servo system 22 is rotated in a plane perpendicular to the alignment grooves 42, thus rotating the three spots that are directed towards the alignment target 38. When the optical reflectance signals of the three spots detected by the optical servo system 22 are equal, i.e., each of the three detected voltages are equal, the azimuth of the recording head 20 and the optical servo system 22 is aligned. The optical servo system 22 is locked down using the adjuster 40. The recording head 20 is ready for the subsequent steps in the manufacturing process.

A number of embodiments of the invention have been described. Nevertheless, it will be understood that various modifications may be made without departing from the spirit and scope of the invention. For example, one of the recording channels on the recording head may be fabricated with an alignment groove etched on a recording channel between the channel's writer and reader.

In another example, as the magnetic tape recording system is in service after manufacturing, the alignment target may be used to make coarse positional adjustments to the optical servo system relative to the selected recording channel. Using a low power microscope, the optical servo system directs a spot of light towards the alignment target. The optical servo system is moved manually using the adjuster until the spot as seen under the microscope is centered over one of the alignment grooves. Once centered over the alignment groove, the optical servo system is locked in place by the adjuster and the magnetic recording tape system is ready for continued use.

Accordingly, other embodiments are within the scope of the following claims.

What is claimed is:

1. A recording head in a read/write assembly of a magnetic recording tape system comprises:
    a plurality of recording channels fabricated on a wafer; and
    an alignment target affixed to the wafer between a first read-write element of a recording channel and a second readwrite element of the recording channel, the alignment target fabricated to produce an optical reflectance signal, wherein the alignment target comprises a plurality of etched alignment grooves, each of the grooves spaced apart from each other and arranged parallel to a direction of magnetic tape travel.

2. The recording head of claim 1 wherein the alignment target is affixed to the wafer using an ultraviolet (UV) cured adhesive.

3. The recording head of claim 1 wherein the recording head and the alignment target are fabricated from the same material.

4. The recording head of claim 3 wherein the material is silicon.

5. The recording head of claim 3 wherein the material is aluminum titanium carbide (AlTiC).

6. The recording head of claim 3 wherein the material is silicon-AMC composite.

7. The recording head of claim 1 wherein the grooves are fabricated using an image reversal resist process.

8. The recording head of claim 1 wherein the grooves are fabricated using a bi-layer resist process.

9. The recording head of claim 1 wherein each of the grooves has a profile to maximize optical signal reflectivity.

10. The recording head of claim 9 wherein the orientation comprises a groove depth, a sloped wall groove angle and a bottom shape.

11. The recording head of claim 10 wherein the groove depth is in the range of 200 to 300 nanometers.

12. The recording head of claim 10 wherein the sloped wall groove angle is in the range of 50 to sixty degrees.

13. The recording head of claim 10 wherein the bottom shape is round.

\* \* \* \* \*